Patented June 22, 1948

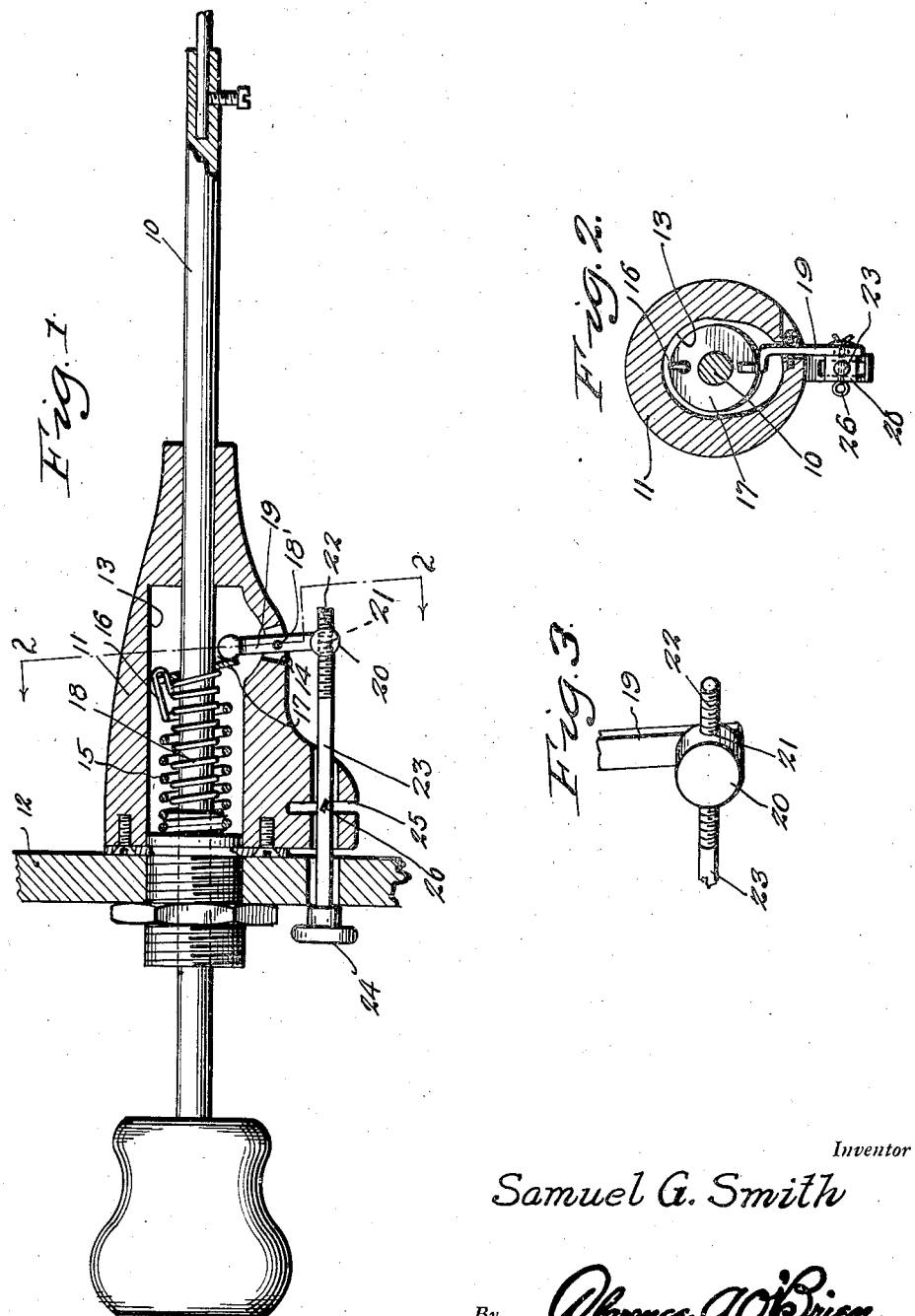

2,443,697

UNITED STATES PATENT OFFICE 2,443,697

DETENT

Samuel G. Smith, Brooklyn, N. Y.

Application September 6, 1946, Serial No. 695,267

2 Claims. (Cl. 74—531)

This invention relates to a detent, and more particularly to a clutch device for an axially movable control rod.

The primary object of the invention is releasably to hold an axially movable control rod in a predetermined adjusted position and against accidental movement.

Another object is to enable the control rod to be moved to an infinite number of positions, and locked in any one of them.

A further object is to enable the pilot of an airplane to adjust the throttle of the engine of the plane to the precise speed desired, and to lock the throttle in such position for an indefinite period of time.

The above and other objects may be attained by employing this invention which embodies among its features a detent for an axially movable control rod comprising a clutch ring encircling the control rod, means engaging the clutch ring on one side of the rod to hold the ring against longitudinal movement along the rod, yielding means exerting pressure on the clutch ring to bias it into clutching engagement with the rod and manually actuated means to move the clutch ring into rod releasing position against the pressure of the yielding means.

In the drawings:

Figure 1 is a longitudinal sectional view through a detent embodying the features of this invention, Figure 2 is a transverse sectional view taken substantially along the line 2—2 of Figure 1, and Figure 3 is a fragmentary perspective view of the lower end of the clutch releasing lever.

Referring to the drawings in detail a control rod 10 is movable axially through a housing 11 which may be mounted in any suitable manner on the instrument panel 12 of a conventional airplane or motor driven vehicle. The housing 11 is provided with a longitudinal bore 13 and a lateral opening 14 which communicates with the bore as will be readily understood upon reference to Figure 1.

Fixed at one end within the bore 13 of the housing 11 is a coil spring 15 which is relatively heavy and is provided at the end opposite its fixed end with a hook 16 which lies along one side of the rod 10 and pivotally supports a clutch ring 17 in rod encircling position. Encircling the rod 10 beneath the spring 15 is a compression coil spring 18 which bears at one end against a fixed abutment while its opposite end bears against the clutch ring 17 so as to bias the latter into clutching engagement with the rod 10 as will be readily understood upon reference to Figure 1.

Pivotally supported at 18' in the recess 14 and diametrically opposite the hook 16 is a lever 19 the inner end of which bears against the clutch ring 17 on the face opposite that engaged by the spring 18, and diametrically opposite the hook 16. The outer end of the lever has pivoted thereto a cylinder 20 which is provided with a transversely extending internally screw threaded bore 21 into which the threaded end 22 of an adjusting rod 23 is received. This adjusting rod extends through the instrument board 12 parallel to the control rod 10 and is provided with a knob 24 by means of which it may be rotated to move the cylinder 20 and lever 19 so as to adjust the clutch ring 17.

In order to hold the adjusting rod against axial movement, the housing 11 is provided with a transverse slot 25 which accommodates opposite ends of a cotter pin 26 which as shown in the drawings is thrust diametrically through the adjusting rod.

In operation it will be understood that when it is desired to adjust the position of the control rod 10, the rod 10 is moved manually inwardly or outwardly as desired. The clutch ring 17 will thus be moved against the pressure of the spring 18 and under the influence of said spring it will again grip and hold the rod against longitudinal movement. The degree of grip of the ring 17 on the rod 10 may be regulated by turning the knob 24 so as to alter the angular position of the clutch ring 17 relative to the axis of the rod 10. Due to the yielding suspension of the clutch ring on the hook 16 of the spring 15 it is obvious that any danger of the clutch ring becoming accidentally disengaged from clutching position of the rod 10 will be avoided, and any tendency for the clutch to become disengaged through vibration will be overcome.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A detent for an axially movable control rod which includes a relatively heavy coil spring encircling the control rod, one end of said spring being anchored against movement longitudinally of said rod, a clutch ring encircling the rod adjacent the opposite end of said spring, a pivotal connection between the spring and the ring on one side of the rod, a compression coil spring encircling the rod within the first mentioned coil spring, and bearing on the clutch ring to bias it into clutching engagement with the rod.

2. A detent for an axially movable control rod which includes a relatively heavy coil spring encircling the control rod, one end of said spring being anchored against movement longitudinally of said rod, a clutch ring encircling the rod adjacent the opposite end of said spring, a pivotal connection between the spring and the ring on one side of the rod, a compression coil spring encircling the rod within the first mentioned coil spring, and bearing on the clutch ring to bias it into clutching engagement with the rod, a lever pivotally supported adjacent the rod, one end of the lever bearing against the clutch ring diametrically opposite the pivotal connection of the ring with the first mentioned spring and manually actuated means to rock the lever about its pivot to exert pressure on the clutch ring in opposition to that exerted by the compression spring and to vary the clutching effect of the ring with the rod.

SAMUEL G. SMITH.

REFERENCES CITED

The following references are of record in the file of this patent:

UNITED STATES PATENTS

| Number | Name | Date |
| --- | --- | --- |
| 2,170,900 | Jandus et al. | Aug. 29, 1939 |
| 2,180,209 | Johnson | Nov. 14, 1939 |